(12) United States Patent
Parker et al.

(10) Patent No.: US 6,457,402 B1
(45) Date of Patent: Oct. 1, 2002

(54) AUTOMATED FRESH AIR EXCHANGER FOR MOBILE CONTAINER

(75) Inventors: Jan M. Parker, Athens, GA (US); Michael E. Davis, Athens, GA (US)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 10/085,146

(22) Filed: Feb. 27, 2002

(51) Int. Cl.[7] .................. A23B 7/00; A23B 7/144; A23L 1/00; A23L 3/00; F24F 7/06
(52) U.S. Cl. .................. 99/475; 62/78; 62/329; 99/467; 99/476; 99/517
(58) Field of Search .................. 99/352–355, 467, 99/468, 472–476, 477, 484, 485, 516, 517, 534; 34/192, 194, 196, 222, 231; 62/329, 419, 78, 89, 314, 381, 408, 303, 374, 384, 304, 414, 417, 426; 165/65; 312/116, 236; 422/28, 40, 292; 426/316–320, 395, 419, 263; 454/88, 292, 118, 284, 301

(56) References Cited

U.S. PATENT DOCUMENTS

| | | | | |
|---|---|---|---|---|
| 4,879,877 A | * | 11/1989 | Hicke | 62/329 X |
| 4,894,997 A | * | 1/1990 | Urushizaki et al. | 99/468 X |
| 5,318,789 A | * | 6/1994 | Nakagawa et al. | 426/316 |
| 5,373,780 A | * | 12/1994 | Bianco | 99/475 |
| 5,419,153 A | * | 5/1995 | Hartley | 99/468 X |
| 5,457,963 A | * | 10/1995 | Cahill-O'Brien et al. | 422/40 X |
| 5,566,608 A | * | 10/1996 | Vejdani et al. | 99/475 X |
| 5,623,105 A | * | 4/1997 | Liston et al. | 62/78 |
| 5,660,057 A | * | 8/1997 | Tyree et al. | 62/384 |
| 5,715,685 A | * | 2/1998 | Takasugi | 62/239 X |
| 5,778,557 A | * | 7/1998 | Leavens | 99/474 |
| 5,789,007 A | * | 8/1998 | Bianco | 99/468 X |
| 6,012,384 A | * | 1/2000 | Badalament et al. | 99/475 |

* cited by examiner

Primary Examiner—Timothy F. Simone
(74) Attorney, Agent, or Firm—Wall Marjama & Bilinski LLP

(57) ABSTRACT

Apparatus for aiding in the ripening of produce that includes a sealed container having a refrigeration unit for supplying conditioned air for cooling produce stored in a container. A gas generator is arranged to mix a ripening gas with conditioned air within the container. A fresh air exchanger is integrated into the refrigeration unit for venting conditioned air from the container to ambient and exchanging the vented air with outside fresh air. The fresh air exchanger is automatically operated by a controller which coordinates the cycling of the gas generator with the exchange of fresh air so that the ripening process can be closely regulated.

7 Claims, 4 Drawing Sheets

AUTOMATED FRESH AIR EXCHANGER FOR MOBILE CONTAINER

FIELD OF THE INVENTION

This invention relates generally to apparatus for aiding in the ripening of perishable produce under tightly controlled conditions.

BACKGROUND OF TO THE INVENTION

In U.S. Pat. No. 6,012,384 to Badalament, there is described an air tight mobile container for storing perishable goods that ripen exothermically. A refrigeration system is arranged to provide conditioned air to the container. Blowers are employed to direct the conditioned air through the inside of the container and to force the air through air permeable bins in which the perishable produce is stored. The conditioned air controls the pulp temperature of the goods to promote uniform ripening of the entire cargo. Oftentimes, the produce is placed in a ripening chamber prior to being loaded into the mobile container and treated with a ripening gas that is dispensed into the chamber to promote a more even ripening of the produce. The produce can, in most cases, spend twenty four hours or longer in the ripening chamber. Considerable time is consumed loading and unloading the ripening chamber. In addition, the extensive handling of the produce during the loading and unloading of the goods can adversely effect the ripening process as well as cause physical harm to the produce.

SUMMARY OF THE INVENTION

It is, therefore, an object of the present invention to improve mobile containers for transporting perishable goods.

It is a further object of the present invention to reduce the amount of time needed to ship freshly picked, perishable produce.

It is a still further object of the present invention to reduce the amount of handling needed when shipping a cargo of perishable goods.

Another object of the present invention is to promote the ripening of produce as the product is being transported to a market place.

These and other objects of the present invention are attained by a mobile container having a refrigeration unit for providing conditioned air to the container. Blowers are arranged inside the container to force the conditioned air into thermal contact with the produce.

A gas generator adds a ripening gas to the conditioned air which promotes ripening of the produce. A fresh air exchanger system is integrated into the refrigeration unit. The fresh air unit contains a damper door that is automatically controlled so that the air which includes the ripening gas is exhausted from the container into the surrounding ambient and fresh outside air is exchanged for the air vented to the outside.

BRIEF DESCRIPTION OF THE DRAWING

For a further understanding of these and other objects of the invention, reference will be made to the following detailed description of the invention which is to be read in connection with the accompanying drawing, wherein.

DETAILED DESCRIPTION OF THE INVENTION

Figure 1:
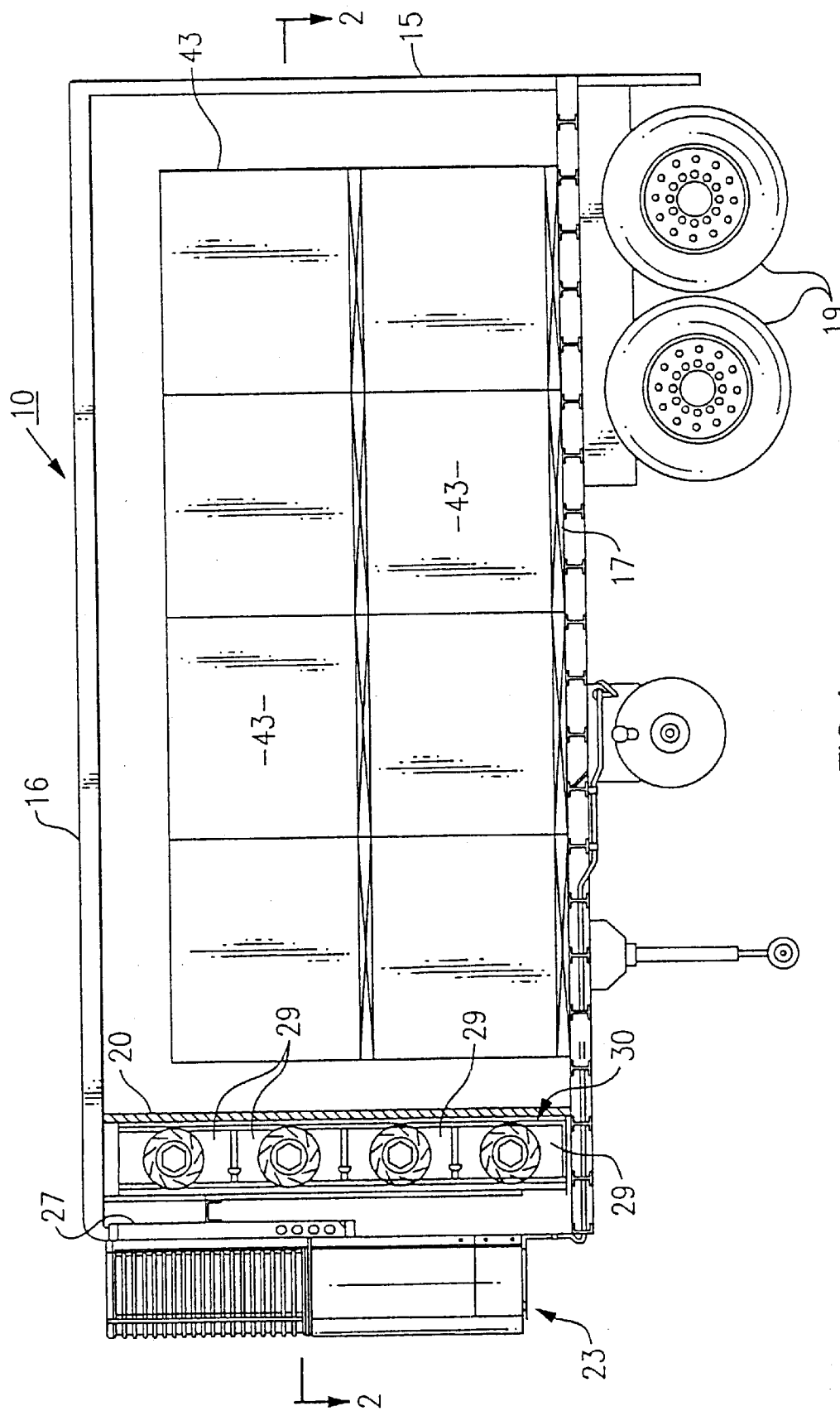
FIG. 1 is a side elevation illustrating a mobile container embodying the teachings of the present invention.
Figure 2:
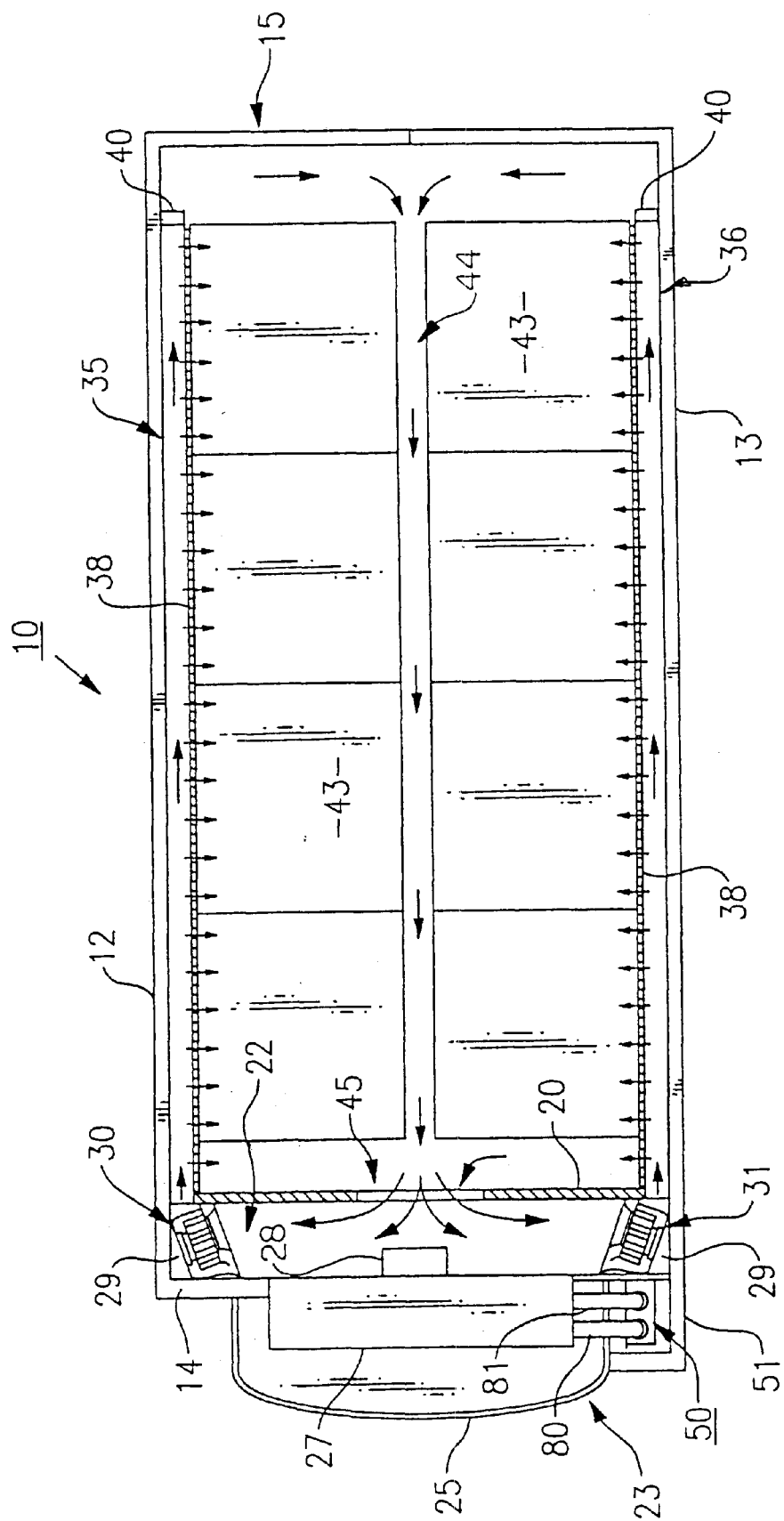
FIG. 2 is a sectional view taken along lines 2—2 in FIG. 1.

Referring initially to FIGS. 1 and 2, there is illustrated a mobile container, generally referenced 10, that embodies the teachings of the present invention. The container includes a pair of opposed sidewalls 12 and 13, a pair of opposed end walls 14 and 15, a top wall 16 and bottom wall 17. Although not shown, the container is sealed to prevent internal air from escaping to the surrounding ambient. The back wall is furnished with doors (not shown) to permit cargo to be loaded into the container bay. A partition 20 is mounted in the front of the container to establish a mixing chamber 22. A refrigeration unit 23 is mounted on the front wall of the container. The refrigeration unit contains an evaporator 27 that is arranged to discharge conditioned air directly into the mixing chamber.

The present container is provided with wheels 19—19 and is designed to serve as a mobile ripening room for certain fruits and vegetables. In certain applications, the produce is stored in a dormant state and a gas is introduced into the conditioned air within the mixing chamber to aid in the ripening process. To this end, a gas generator 28 (FIG. 2) is mounted in the mixing chamber for introducing a ripening gas into the container to modify the container atmosphere for a given period of time until the produce being treated reaches a desired stage of ripeness. The gas flow is then terminated and, as will be explained in greater detail below, the gas is purged from the container to prevent further ripening of the goods.

A series of blowers 29—29 are mounted in stacks within the mixing chamber. A first stack 30 containing four blowers is placed adjacent the curbside wall 12 of the container while a second stack 31 of four blowers is similarly stacked adjacent to the roadside sidewall 13 of the container. The first stack of blowers is arranged to draw air from the mixing chamber and direct the air toward the rear of the container along a curbside supply air plenum generally referenced 35. The second stack of blowers is arranged to draw air from the mixing chamber and direct the air along a roadside supply plenum generally referenced 37. Each plenum is located adjacent to a side wall of the container and extends back from the front wall of the container towards the rear wall. Each plenum further includes a back closure wall 40 that is repositionable along the length of plenum so that the length of the plenum may be selectively adjusted depending upon the load.

Bins or boxes 43—43 which contain perishable goods are stacked in two parallel rows against the air penetratable wall of each supply air plenum. The boxes, are air penetratable so that conditioned air can move freely through the boxes. The two rows of boxes are spaced apart as illustrated in FIG. 1 to establish a return isle 44 that runs down the center of the container. An opening 45 is contained in partition 20 that extends from the floor of the container to the top wall of the container. The opening is coaxially aligned along the central axis of the container so that air can move freely from the return isle through the opening into the mixing chamber.

As indicated by the arrows in FIG. 2, conditioned air is introduced from the refrigeration unit into the mixing chamber. The blowers, in turn, draw the air from the mixing chamber and move a high volume of air down each of the supply air plenums. The supply air plenums which are closed by the back walls 40, thus become pressurized. Accordingly, the pressurized supply air is forced through the air penetratable boxes into heat transfer relation with the goods stored in the boxes wherein the goods are conductively cooled at a desired rate. Upon passing through the boxes, the air enters the return isle and, under the influence of the blowers, is drawn into the mixing chamber where some air is recirculated over the evaporator coils of the refrigeration unit and the remaining air is mixed with conditioned air from the refrigeration unit.

The flow of air through the mixing chamber is rather turbulent due to the action of the blowers and the flow of conditioned air entering from the evaporator. As a result, the ripening gas produced by the gas generator 28 is thoroughly mixed with the conditioned air before reaching the produce. It is important to purge the gas from the trailer upon termination of the ripening cycle in order to control the ripening process and prevent over ripening of the produce. A fresh air exchanger unit generally referenced 50 is integrated into the refrigeration unit which serves to efficiently vent the gas filled conditioned air to ambient and exchange vented air for fresh outside air.

Figure 3:
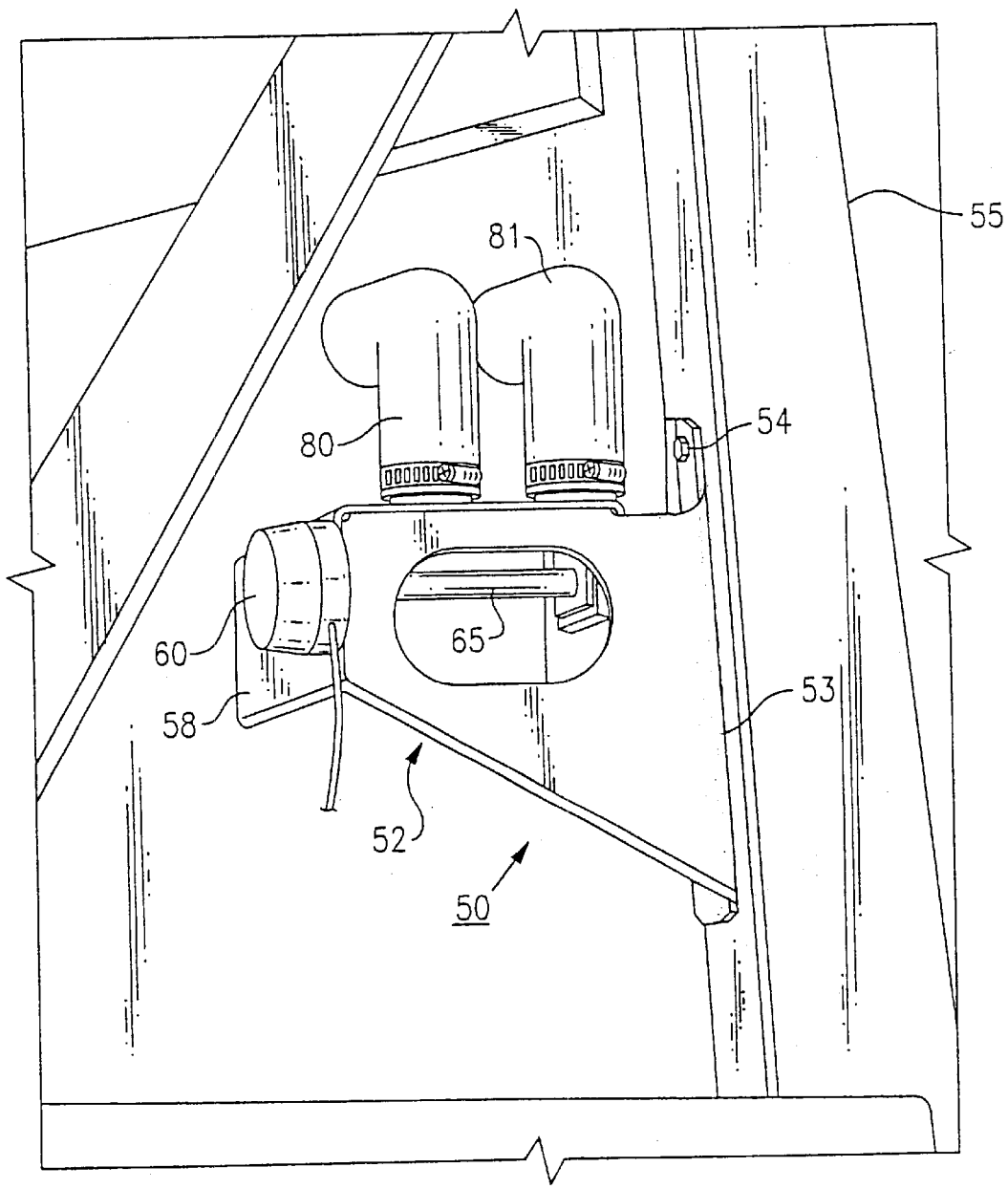
FIG. 3 is an enlarged perspective view of a fresh air exchanger unit employed in the practice of the invention.
Figure 4:
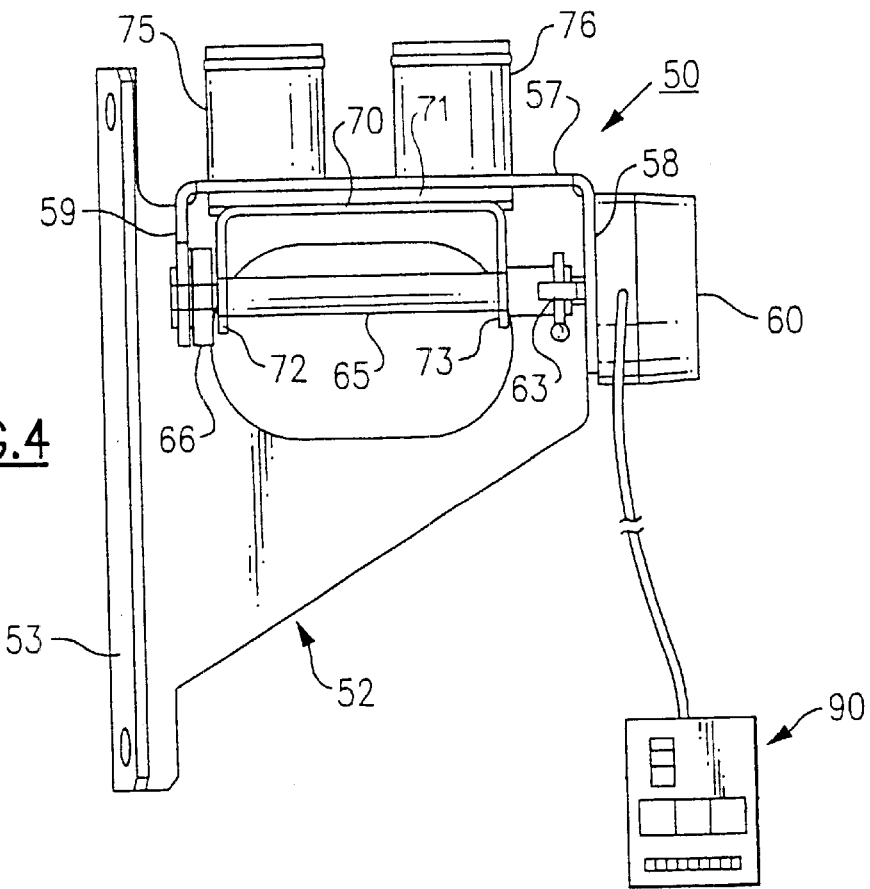
FIG. 4 is a side elevation of the fresh air exchanger unit.
Figure 5:
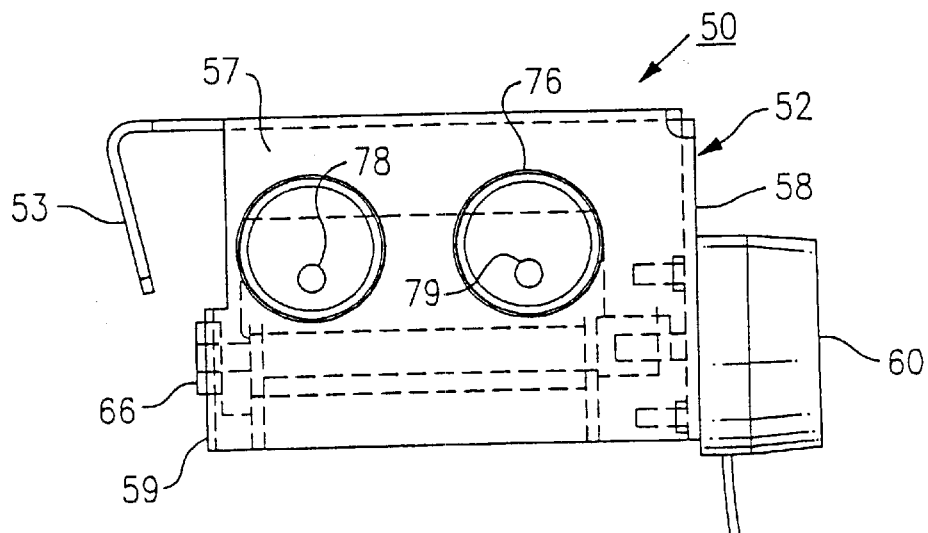
FIG. 5 is a top view of the fresh air exchanger unit.

Referring now to FIGS. 3–5, the fresh air exchanger unit 50 is supported upon a bracket 52 that is mounted inside the refrigeration unit. The bracket is provided with a vertically disposed mounting flange 53 that is fastened by screws 54 to a vertical column 55 that forms part of the container's superstructure. The bracket contains a top shelf 57 and a pair of spaced apart arms 58 and 59 that are integral with the shelf and which extends downwardly from the shelf. An electrically driven rotary actuator 60 is mounted upon the outside of arm 58. The actuator includes a drive shaft 63 that is adapted to pass through a clearance hole formed in the arm 58. The drive shaft is coupled to one end of an elongated driven shaft 65. The opposite end of the driven shaft is supported in a bearing 66 mounted in the opposing arm 57 so that the control shaft rotates about the vertical axis 68 of the actuator 60. A damper door 70 is connected to the driven shaft 65 by a pair of side plates 72 and 73 so that the damper door turns with the driven shaft. A pair of cylindrical connectors 75 and 76 are mounted upon the top surface of the bracket shelf 57.

As best illustrated in FIG. 5, a pair of metering ports 78 and 79 are passed through the shelf so that they open inside the connectors 75 and 76, respectively. The actuator 60 is adapted to turn the door through about 45° C. of rotation. The damper door is, in turn, arranged to move between a closed position as shown in FIG. 4 wherein the door closes the two metering ports and an open position wherein the ports are fully opened to the surrounding ambient. A gasket 71 is placed between the door and the metering ports at closure to prevent air from passing through the ports when the door is closed. A pair of hoses 80 and 81 (FIGS. 2 and 3) are secured at one end to the connectors by clamps 83 and the opposite ends of the hoses are run into the evaporation section of the refrigeration unit. A first hose 80 is connected to the high pressure side of the evaporator section 27 while a second hose 81 is connected to the low pressure side of the evaporator section. Accordingly, when the damper door is opened, air from the high pressure side of the evaporator is forced out of the container and exhausted to the surrounding ambient while at the same time fresh ambient air is drawn into the low pressure side of the evaporator to replace the air that is being exhausted.

The fresh air exchanger is arranged to act in association with the ripening gas generator 28, through means of a controller 90. The gas generator is initiated by starting a programmable timer 91 situated in the controller (FIG. 4). At this time, the damper door is automatically closed by the actuator 60 and no container air is being exchanged for ambient air. The damper door remains closed until the timer cycles out at which time the gas generator is cycled off and the damper door is opened and will remain open until another ripening cycle is initiated.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. Apparatus for aiding in the ripening of perishable produce that includes:

a sealed container for said produce, a refrigeration system mounted outside of said container for providing conditioned air to said container, said refrigeration unit including an evaporator having a high pressure side and a low pressure side, a cyclicable gas generator for supplying a ripening gas to the conditioned air inside said container, a fresh air exchanger that is integrated into the refrigeration system having a pair of metering ports that include a first metering port that is connected to the low pressure side of the evaporator and a second metering port that is connected to the high pressure side of the evaporator, a damper door movable between a closed position over said metering ports wherein air is prevented from moving through said ports and an open position wherein air is exchanged between ambient and the high and low pressure sides of the evaporator, and control means for opening and closing the damper door in response to the cycling of the gas generator.

2. The apparatus of claim 1 that further includes a rotary actuator connected to said controller for moving the damper door between an open and closed position.

3. The apparatus of claim 2 wherein said metering ports are connected to the evaporator by hoses.

4. The apparatus of claim 2 wherein the rotary actuator is connected to a shaft and the shaft is connected to said damper door by a pair of spaced apart arms.

5. The apparatus of claim 1 wherein said control means further includes a timer means for cycling the gas generator and controlling the opening and closing of the damper door.

6. The apparatus of claim 1 that further includes a gasket for closing against the metering ports when the damper door is placed in the closed position.

7. The apparatus of claim 1 wherein the container is a mobile unit for transporting produce.

* * * * *